US006690801B2

(12) United States Patent
Yeh

(10) Patent No.: US 6,690,801 B2
(45) Date of Patent: Feb. 10, 2004

(54) AUDIO JACK HAVING IMPROVED ARRANGEMENT OF CONTACTS

(75) Inventor: Joel J. Yeh, San Gabrie, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 46 days.

(21) Appl. No.: 09/996,442

(22) Filed: Nov. 28, 2001

(65) Prior Publication Data

US 2003/0100227 A1 May 29, 2003

(51) Int. Cl.[7] .................................................. H04B 3/00
(52) U.S. Cl. .......................... 381/77; 439/668; 439/188
(58) Field of Search ............................ 381/77, 80, 309; 439/188, 668, 669

(56) References Cited

U.S. PATENT DOCUMENTS 6,220,898 B1 * 4/2001 Wu ............................ 439/668

* cited by examiner

*Primary Examiner*—Minsum Oh Harvey
(74) *Attorney, Agent, or Firm*—Wei Te Chung

(57) ABSTRACT

An audio jack (100) includes an insulative housing (1) and a set of contacts (2) assembled on the insulative housing. The insulative housing defines a longitudinal hole (12) therethrough for receiving a mating plug (3) and having a top wall (13), a bottom wall (14), a first sidewall (15), a second sidewall (16) and a rear wall (17). The set of contacts includes a first contact (21), a second contact (22), a third contact (23) and a fourth contact (24). The fourth contact is secured to the rear wall of the insulative housing for minimizing the profile of the audio jack.

17 Claims, 5 Drawing Sheets

AUDIO JACK HAVING IMPROVED ARRANGEMENT OF CONTACTS

FIELD OF THE INVENTION

The present invention relates to an audio jack, and particularly to an audio jack having improved arrangement of contacts.

BACKGROUND OF THE INVENTION

A conventional surface mounting type audio jack as disclosed in U.S. Pat. No. 5,919,052 comprises an insulative housing and a plurality of contacts. The housing has an opening at a bottom thereof, and a plurality of slots are formed beside of the opening. The contacts are retained in the slots. Moreover, the jack further has a cover mounted to the bottom of the housing for closing the opening.

However, a first disadvantage of this structure is that the retention force between the housing and the contacts is insufficient and the assembling process of the contacts and the housing is complex. A second disadvantage is that the contacts are retained in sidewalls of the housing so the sidewall needs to have a large thickness to accommodate the contacts. Therefore, it is difficult to minimize the profile of the jack.

Hence, an improved audio jack is needed to overcome the above-mentioned deficiencies of current audio jacks.

SUMMARY OF THE INVENTION

Accordingly, a primary object of the present invention is to provide an audio jack having improved arrangement of contacts.

Another object of the present invention is to provide an audio jack having a lower profile.

To achieve the above objects, an audio jack in accordance with the present invention comprises an insulative housing and a set of contacts assembled with the insulative housing. The insulative housing defines a longitudinal plug-insertion hole therethrough for receiving a mating plug. The insulative housing includes a main body and a cylindrical sleeve forwardly extending from a front face of the main body. The main body has a top wall, a bottom wall, a first sidewall, a second sidewall and a rear wall. The top wall defines a projection, the second sidewall defines a slot opening to the rear wall. The set of contacts at least includes a first contact, a second contact, a third contact and a fourth contact. The fourth contact has a base section, a latch loop extending from the base section for engaging with the projection and a latch extending from the base section for being retained in the slot. When the mating plug is not inserted into the insulative housing, the fourth contact contacts with the second contact. When the mating plug is inserted into the insulative housing, the mating plug pushes the second contact and separates the second contact from the fourth contact.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
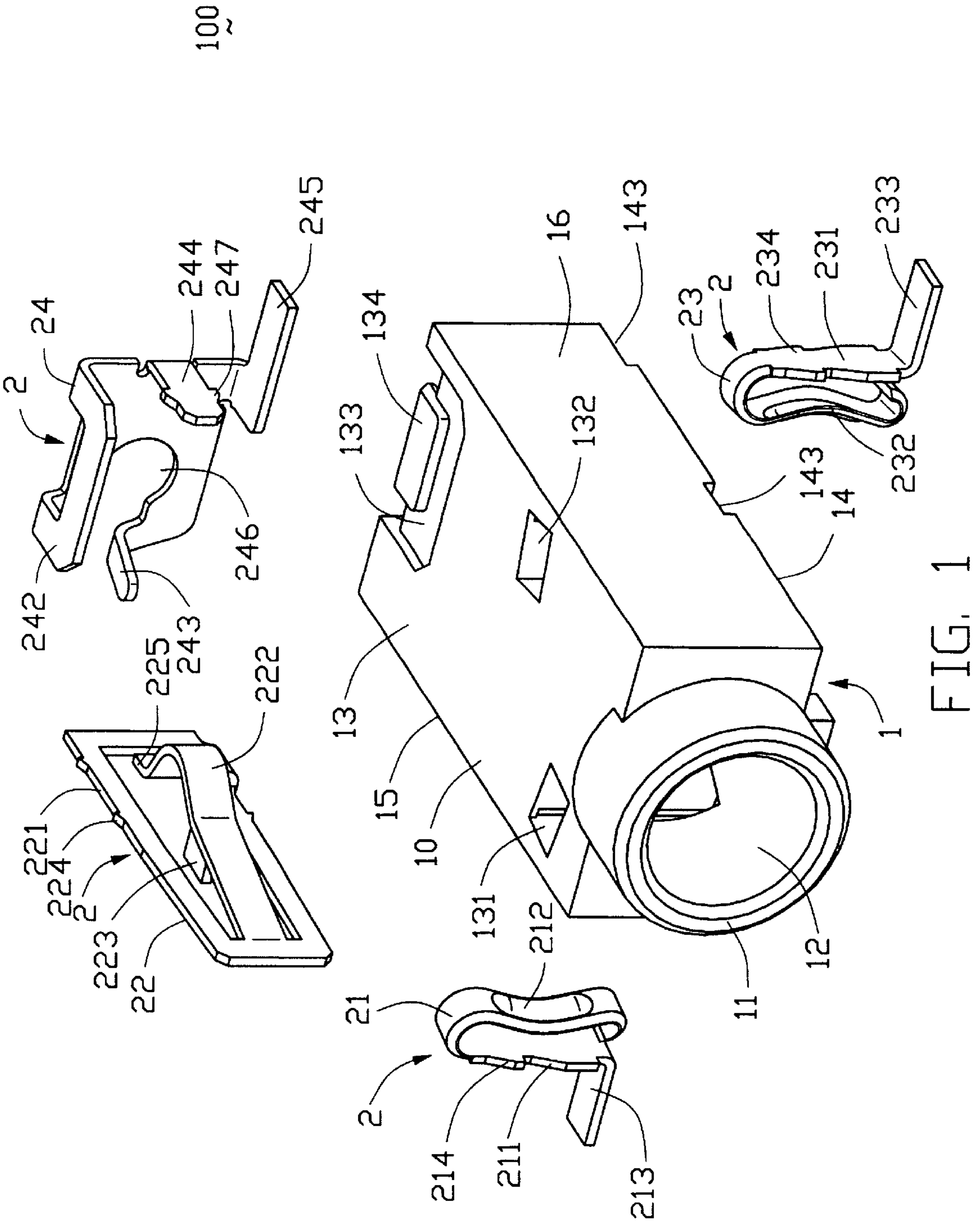
FIG. 1 is an exploded view of an audio jack of the present invention.
Figure 2:
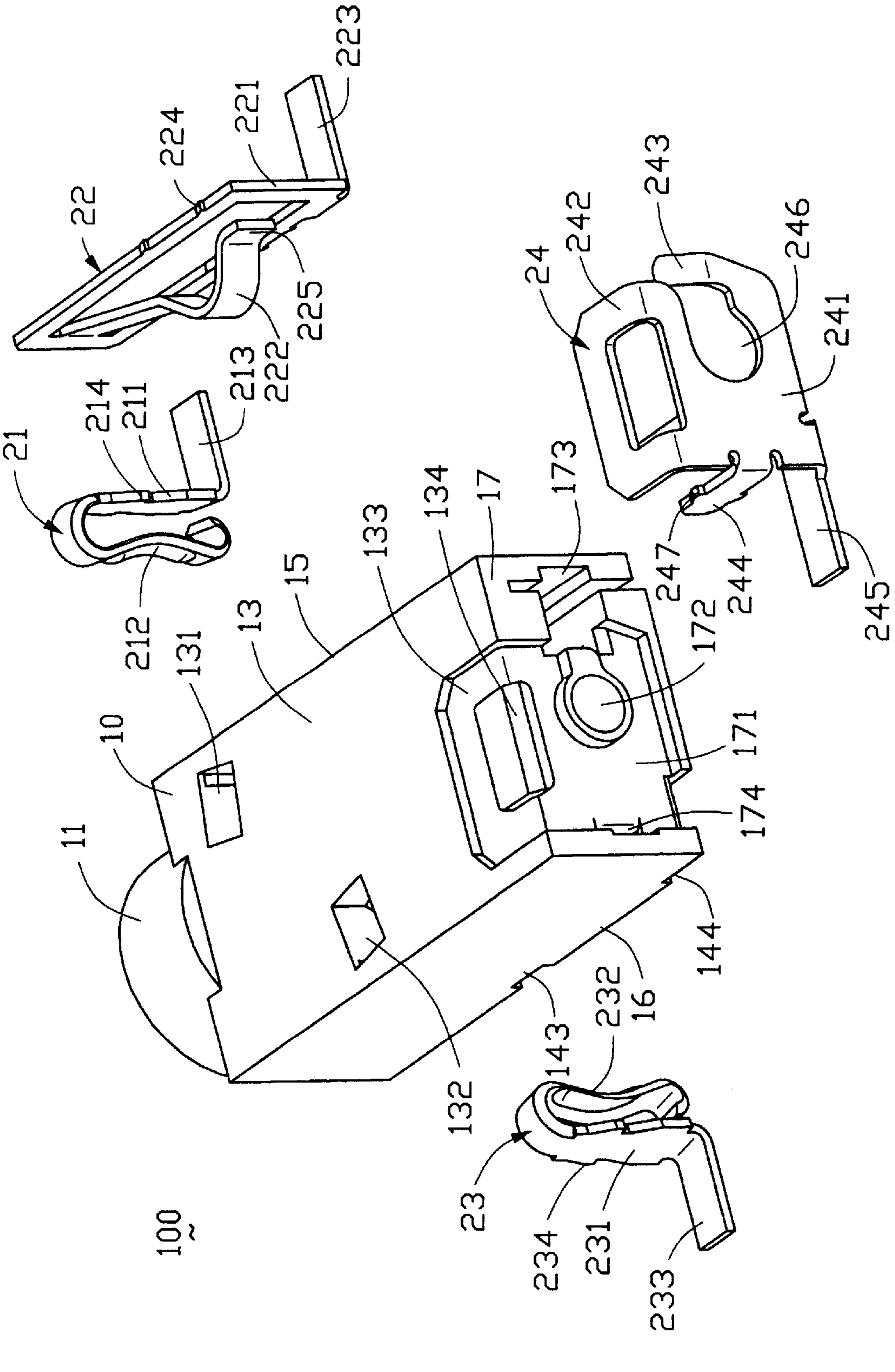
FIG. 2 is an another exploded view of the audio jack of FIG. 1.

Referring to FIGS. 1 and 2, an audio jack 100 according to the present invention comprises an insulative housing 1 and a set of contacts 2.

The insulative housing 1 includes a substantially cubical main body 10 and a cylindrical sleeve 11 forwardly extending from a front face of the main body 10. A plug-insertion hole 12 is longitudinally defined through the main body 10 and the sleeve 11 for receiving a mating plug 3 (referring to FIG. 5).

The main body 10 has a top wall 13, a bottom wall 14, a first sidewall 15, a second sidewall 16 opposite to the first sidewall 15 and a rear wall 17. A first opening 131 adjacent to the first sidewall 15 is defined in the top wall 13, and defined adjacent to the second sidewall 16 is a second opening 132 which is displaced from the first opening 131 along the longitudinal direction. The first opening 131 and the second opening 132 run through the top wall 13 and the bottom wall 14 and both communicate with the plug-insertion hole 12. A recess 133 is formed at the rear end of the top wall 13, and a projection 134 protrudes upwardly in the recess 133.

Figure 4:
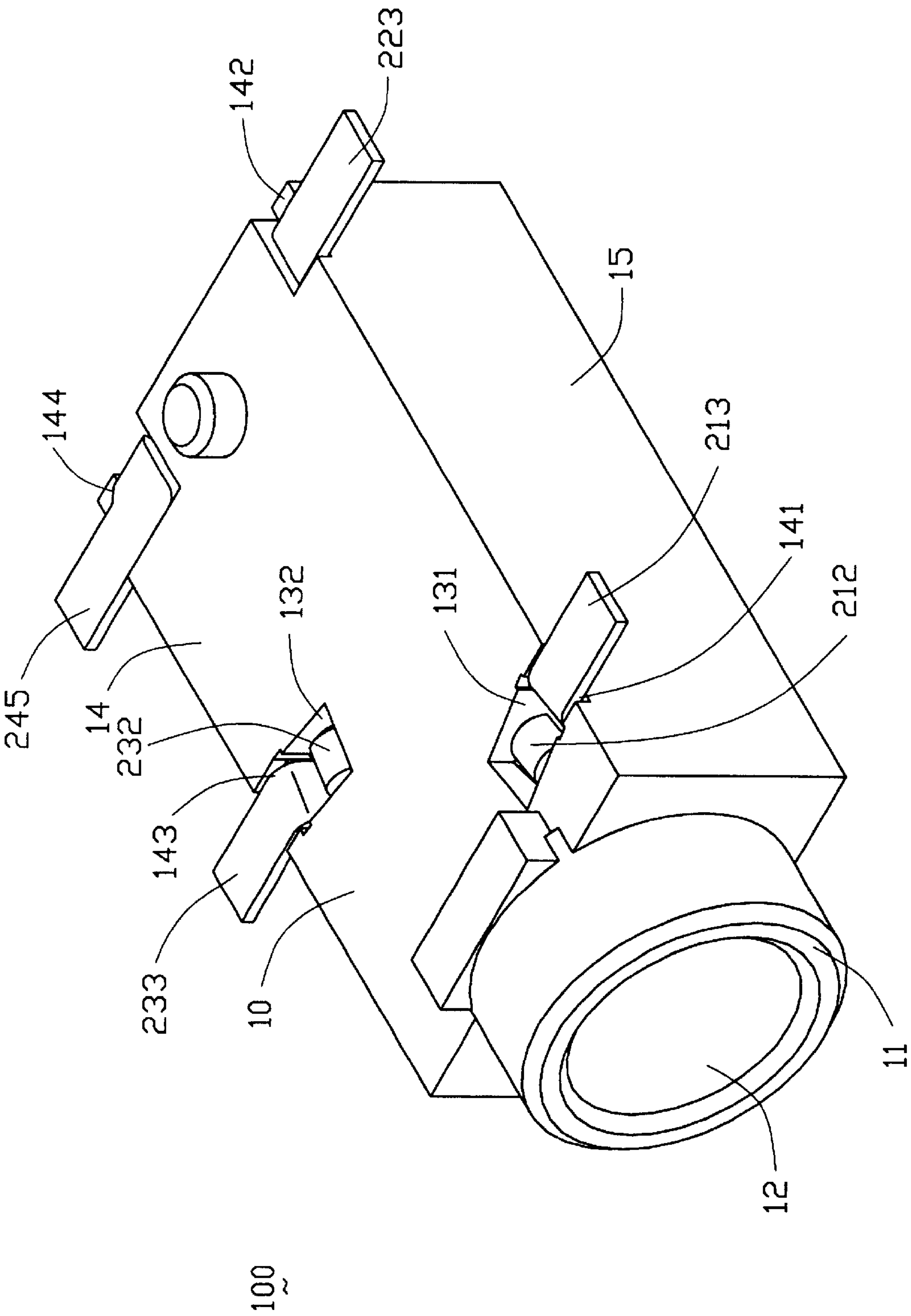
FIG. 4 is an another assembled view of the audio jack of FIG. 1.

Referring to FIG. 4, the bottom wall 14 forms a first groove 141 communicating with the first opening 131, a second groove 142 adjacent to a corner of the first sidewall 15, a third groove 143 communicating with the second opening 132 and a fourth groove 144 adjacent to a corner of the second sidewall 16.

Particularly referring to FIG. 2, the rear wall 17 recesses inwardly to form a receiving space 171 for receiving the fourth contact 24. A circular protrusion 172 is protruded from the receiving space 171. A passageway 173 communicating with the plug-insertion hole 12 extends inwardly from the rear wall 17 along the first sidewall 15. A slot 174 is defined in the second sidewall 16 and opens to the rear wall 17.

The set of contacts 2 comprises a first contact 21, a second contact 22, a third contact 23 and a fourth contact 24.

The first contact 21 has a first securing portion 211, a first resilient portion 212 extending downwardly at an angle from the top end of the first securing portion 211 and a rectangular first solder tab 213 extending perpendicularly from the bottom end of the first securing portion 211 for being surface mounted on a printed circuit board (PCB) (not shown). A pair of first barbs 214 for retaining the first contact 21 in the housing 1 are formed at two opposite edges of the first securing portion 211.

The second contact 22 has a rectangular and hollow frame 221, a second resilient portion 222 extending sidewardly at an angle from the front end of the rectangular frame 221 and a second solder tab 223 extending perpendicularly from rear end of the rectangular frame 221. Two pairs of second barbs 224 for retaining the second contact 22 in the housing 1 are respectively formed at the top and bottom edges of the rectangular frame 221. An engaging portion 225 is formed at the free end of the resilient portion 222.

The third contact 23 is similar to the first contact 21 and has a third securing portion 231, a third resilient portion 232 extending downwardly at an angle from top end of the third securing portion 231 and a third solder tab 233 extending perpendicularly from the bottom end of the third securing portion 231 for being surface mounted on the PCB. A pair of third barbs 234 for retaining the third contact 23 in the housing 1 are formed at two opposite edges of the third securing portion 231.

The fourth contact 24 has a base section 241, a latch loop 242 extending perpendicularly and forwardly from the base section 241, a contact portion 243, a latch 244 and a fourth solder pad 245. The base section 241 defines a notch 246 therein. The notch 246 is corresponding in shape to the circular protrusion 172 of the insulative housing 1. The contact portion 243 extends forwardly from the base section 241 in an orientation same as the latch loop 242. The latch 244 protrudes vertically and forwardly from the base section 241, and a pair of fourth barbs 247 are formed at two opposite edges of the latch 244 for securely retaining the latch 244 in the insulative housing 1. The fourth solder pad 245 protrudes horizontally from bottom end of the base section 241 for soldering to the PCB.

Figure 3:
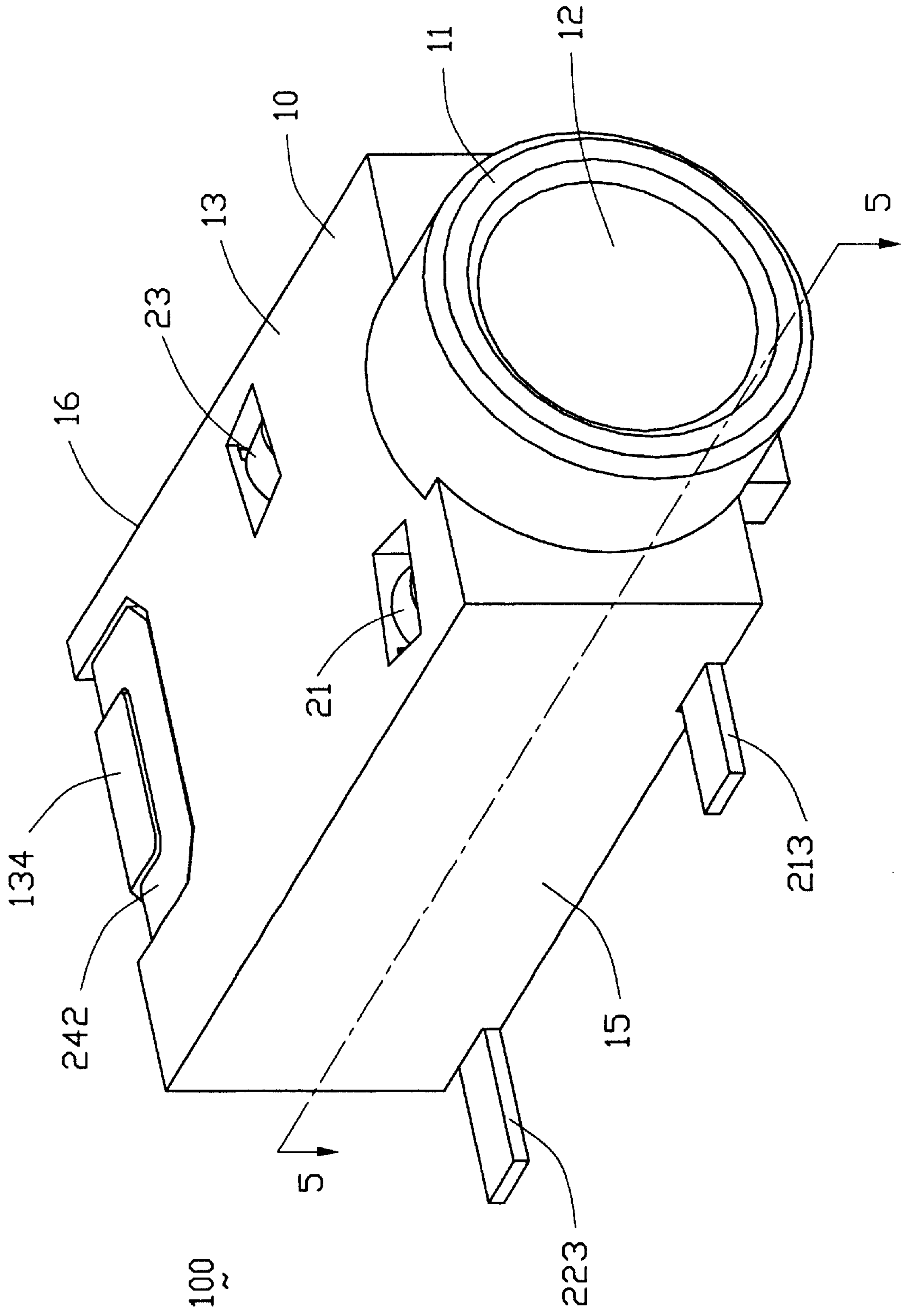
FIG. 3 is an assembled view of the audio jack of FIG. 1.
Figure 5:
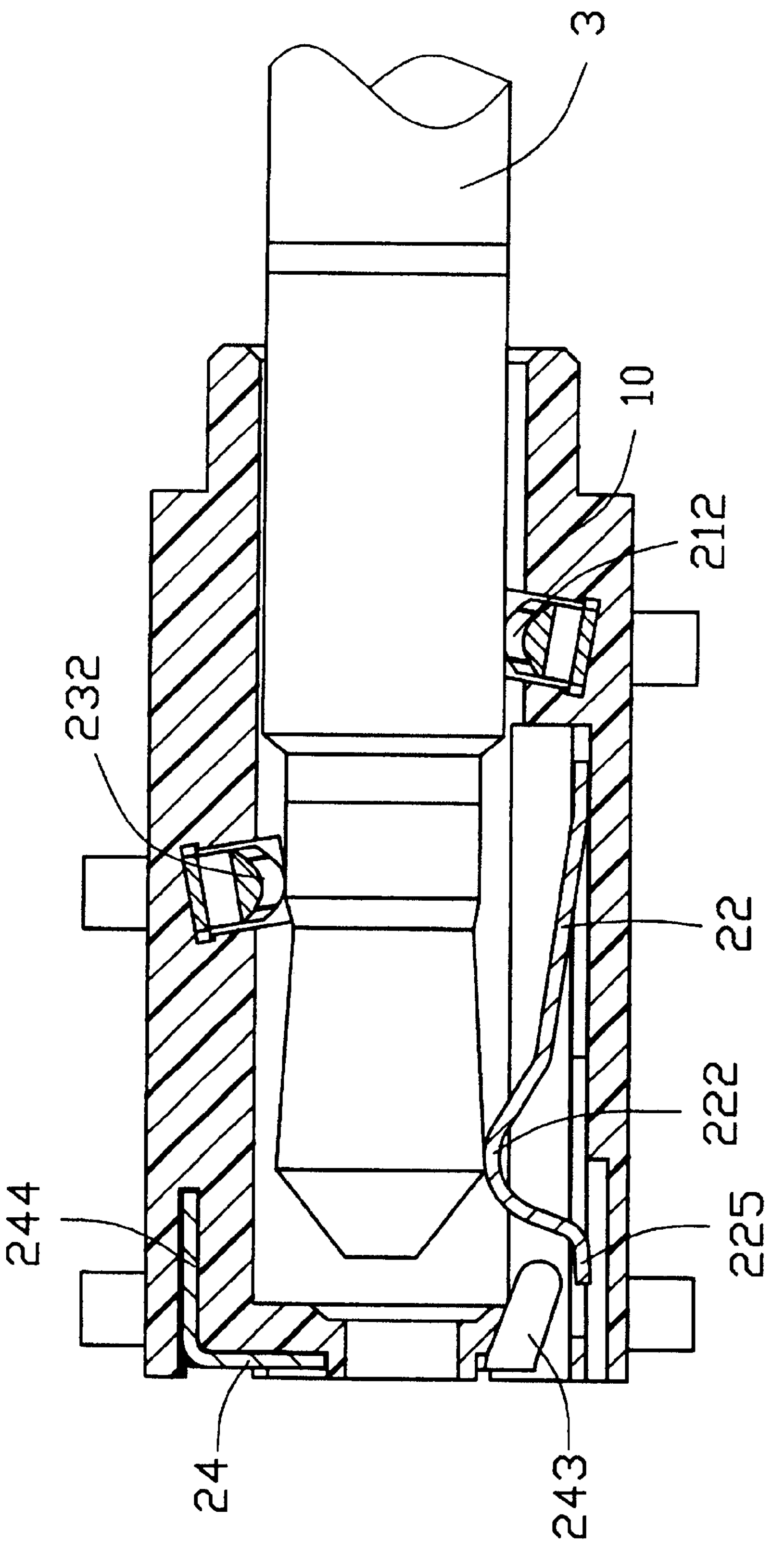
FIG. 5 is a cross-sectional view taken along line 5—5 of FIG. 3, particularly showing how a mating plug inserted into the housing interacts with the contacts.

In assembly, with reference to FIGS. 3, 4 and 5, the first contact 21 is retained in the first opening 131 by engagement of the first barbs 214 of the first securing portion 211 in the first opening 131. The first resilient portion 212 projects inwardly from the first sidewall 15 into the plug-insertion hole 12. The first solder pad 213 is received in the first groove 141. The second contact 22 is received in the passageway 173. The second barbs 224 are retained in the passageway 173. The second resilient portion 222 extends into the plug-insertion hole 12. The second solder pad 223 is received in the second groove 142. The third contact 23 is retained in the second opening 132 by engagement of the third barbs 234 in the second opening 132. The third resilient portion 232 projects inwardly from the second sidewall 16 into the plug-insertion hole 12. The third solder pad 233 is received in the third groove 143. The fourth contact 24 is assembled to the rear wall 17 of the insulative housing 1. The base section 241 is received in the receiving space 171 of the rear wall 17 and the notch 246 receives the circular protrusion 172. The latch loop 242 of the fourth contact 24 is engaged with the projection 134 of the insulative housing 1. The contact portion 243 protrudes into the passageway 173 and contacts with the engaging portion 225 of the second contact 22 when the mating plug 3 is not yet inserted into the insulative housing 1. The latch 244 is retained in the slot 174, and the fourth barbs 247 thereof are retained in the slot 174. The fourth solder pad 245 is received in the fourth groove 144. Therefore, the insulative housing 1 and the set of contacts 2 are assembled reliably.

Particularly referring to FIG. 5, when the mating plug 3 is inserted into the housing 1, the first resilient portion 212 of the first contact 21 and the third resilient portion 232 of the third contact 23 respectively abut against different position of the mating plug 3. Meanwhile, the mating plug 3 pushes the resilient portion 222 and separates the engaging portion 225 of the second contact 22 from the contact portion 243 of the fourth contact 24.

In the present invention, the latch loop 242 engages with the projection 134 of the insulative housing 1 to provide a transverse retention, and the latch 244 engages with the slot 174 to provide a longitudinal retention. The fourth contact 24 can be reliably locked in the insulative housing 1 by the transverse and longitudinal retention. Furthermore, since the fourth contact 24 is secured to the rear wall 17 of the insulative housing 1, the second sidewall 16 need not be thickened for receiving the fourth contact 24, which will make the audio jack 100 slim. Therefore, the present invention overcomes the deficiencies of the conventional audio jacks.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. An audio jack for receiving a mating plug, comprising:

an insulative housing defining a longitudinal plug-insertion hole therethrough and having a top wall, a bottom wall, a first sidewall, a second sidewall and a rear wall;

a set of contacts assembled on the insulative housing and including a first contact, a second contact, a third contact and a fourth contact, wherein the fourth contact is secured to the rear wall of the insulative housing and wherein the top wall of the insulative housing defines a projection, the fourth contact has a latch loop for engaging with the projection and securing the fourth contact to the rear wall in the transverse orientation.

2. The audio jack in accordance with claim 1, wherein the second sidewall of the insulative housing defines a slot opening to the rear wall, the fourth contact has a latch for being retained in the slot and securing the fourth contact to the rear wall in the longitudinal orientation.

3. The audio jack in accordance with claim 1, wherein the first sidewall of the insulative housing forms a passageway opening to the rear wall and communicating with the plug-insertion hole for receiving the second contact.

4. The audio jack in accordance with claim 3, wherein the second contact has a frame and a second resilient portion extending from the frame, the second resilient portion having an engaging portion, the fourth contact has a contact portion protruding into the passageway and contacting the engaging portion.

5. The audio jack in accordance with claim 4, wherein the rear wall of the insulative housing defines a protrusion, the fourth contact has a notch for engaging with the protrusion.

6. The audio jack in accordance with claim 1, wherein the insulative housing defines a first opening and a second opening communicating with the plug-insertion hole, the first contact and the third contact are respectively received therein.

7. The audio jack in accordance with claim 1, wherein each contact comprises a solder pad, the bottom wall of the insulative housing defines a plurality of grooves for receiving the solder pads of the set of contacts.

8. An audio jack for receiving a mating plug, comprising:

an insulative housing defining a longitudinal plug-insertion hole therethrough and having a top wall, a bottom wall, a first sidewall, a second sidewall and a rear wall, the top wall defining a projection, the second sidewall defining a slot opening to the rear wall; and a set of contacts assembled on the insulative housing and including a first contact, a second contact, a third contact and a fourth contact, the fourth contact further comprising a base section, a contact portion extending forwardly from the base section, a latch loop extending from the base section for engaging with the projection and a latch extending from the base section for being retained in the slot.

9. The audio jack in accordance with claim 8, wherein the first sidewall of the insulative housing forms a passageway opening to the rear wall and communicating with the plug-insertion hole for receiving the second contact.

10. The audio jack in accordance with claim 9, wherein the second contact has a frame and a second resilient portion extending from the frame, the second resilient portion having an engaging portion, the contact portion of the fourth contact protruding into the passageway and contacting the engaging portion.

11. The audio jack in accordance with claim 10, wherein the rear wall of the insulative housing defines a protrusion, the base section of the fourth contact has a notch for engaging with the protrusion.

12. The audio jack in accordance with claim 8, wherein the insulative housing defines a first opening and a second opening communicating with the plug-insertion hole, the first contact and the third contact are respectively received therein.

13. The audio jack in accordance with claim 8, wherein each contact comprises a solder pad, the bottom wall of the insulative housing defines a plurality of grooves for receiving the solder pads of the set of contacts.

14. An electrical connector comprising:

an insulative housing defining a mating port thereof;

a contact including:

a vertical base section abutting against one face of said housing;

a solder pad horizontally extending from a bottom edge portion of said base section, said solder pad being perpendicular to said base section;

a latch, with barbs thereon, extending horizontally from the base section, said latch being perpendicular to said base section and extending into the housing from said face and interferentially engaged within the housing; and a latch loop extending perpendicularly from said base section with flexibility to pass a projection on the housing and eventually received within a recess beside said projection for latching.

15. An electrical connector assembly comprising:

an insulative housing defining a plug-insertion hole extending along a front-to-back direction thereof;

a plug inserted into the plug-insertion hole along said front-to-back direction;

a conductive contact vertically inserted into the housing beside said plug-insertion hole, said contact including:

a retention portion for retaining the contact in the housing;

a horizontally extending solder tab; and a resilient portion generally extending in a vertical direction; wherein said resilient portion defines a confrontation direction which is not perpendicular to said front-to-back direction but instead is obliquely toward a front opening of said plug-insertion hole.

16. The assembly in accordance with claim 15, wherein said housing defines a vertical opening to receive the resilient portion, and a horizontal cross-section of said vertical opening is not perpendicular to said front-to-back direction but instead toward the front opening of the plug insertion hole.

17. The assembly in accordance with claim 15, wherein said resilient portion generally defines an acute angle relative to the retention portion.

* * * * *